(12) United States Patent
Chhabra et al.

(10) Patent No.: US 11,530,648 B2
(45) Date of Patent: Dec. 20, 2022

(54) AIR TURBINE STARTER

(71) Applicants: Unison Industries, LLC, Jacksonville, FL (US); General Electric Company, Schenectady, NY (US)

(72) Inventors: Parmeet Singh Chhabra, Bangalore (IN); David Raju Yamarthi, Bangalore (IN); Shiloh Montegomery Meyers, Miamisburg, OH (US); Sagar Paramashivaiah, Bangalore (IN); Steven Ryan Kerley, Columbus, OH (US); Eliel Fresco Rodriguez, Essex JCT, VT (US)

(73) Assignees: Unison Industries, LLC, Jacksonville, FL (US); General Electric Company, Schenectady, NY (US)

( * ) Notice: Subject to any disclaimer, the term of this patent is extended or adjusted under 35 U.S.C. 154(b) by 0 days.

(21) Appl. No.: 17/412,693

(22) Filed: Aug. 26, 2021

(65) Prior Publication Data
US 2022/0065168 A1 Mar. 3, 2022

(30) Foreign Application Priority Data

Sep. 2, 2020 (IN) .............................. 202011037891

(51) Int. Cl.
*F02C 7/27* (2006.01)
*F01D 19/00* (2006.01)
*F01D 25/24* (2006.01)

(52) U.S. Cl.
CPC ................ *F02C 7/27* (2013.01); *F01D 19/00* (2013.01); *F01D 25/243* (2013.01); *F05D 2220/32* (2013.01); *F05D 2260/85* (2013.01)

(58) Field of Classification Search
CPC .......... F01D 19/00; F01D 21/02; F01D 21/04; F01D 21/045; F01D 25/243; F02C 7/27; F02C 7/277; F05D 2220/32; F05D 2260/31; F05D 2260/85
See application file for complete search history.

(56) References Cited

U.S. PATENT DOCUMENTS

| | | | |
|---|---|---|---|
| 3,048,364 A | 8/1962 | Troeger et al. | |
| 4,509,896 A | 4/1985 | Linsker | |
| 5,042,963 A * | 8/1991 | Sorenson ................ | F02C 7/268 415/18 |
| 6,533,541 B1 * | 3/2003 | Farnsworth ............... | F02C 7/05 415/121.2 |
| 6,623,238 B2 * | 9/2003 | Langston ................ | F01D 11/00 415/113 |
| 6,681,579 B2 * | 1/2004 | Lane ....................... | F02C 7/277 60/788 |
| 6,814,539 B2 | 11/2004 | Farnsworth et al. | |
| 8,647,049 B2 | 2/2014 | Evans et al. | |

(Continued)

FOREIGN PATENT DOCUMENTS

EP 3434880 A1 1/2019

*Primary Examiner* — Jesse S Bogue
(74) *Attorney, Agent, or Firm* — McGarry Bair PC (57) ABSTRACT

An air turbine starter for starting an engine includes a starter housing defining an inlet, an outlet, and a flow path extending between the inlet and the outlet. A turbine section is located within the starter housing and includes a turbine member having a central disk and a set of airfoils spaced circumferentially about the central disk, as well as a sealing structure located within the starter housing.

19 Claims, 5 Drawing Sheets

(56) References Cited

U.S. PATENT DOCUMENTS

| | | |
|---|---|---|
| 10,202,850 B2 | 2/2019 | House |
| 10,316,756 B2 | 6/2019 | Gentile et al. |
| 2006/0207834 A1 | 9/2006 | Giesler et al. |
| 2006/0257253 A1* | 11/2006 | Dong ............... F02C 7/277 415/206 |
| 2012/0006035 A1* | 1/2012 | Makulec ............... F02C 7/277 60/778 |
| 2017/0037029 A1* | 2/2017 | Kita ............... C07D 239/28 |
| 2017/0370294 A1* | 12/2017 | Gentile ............... F01D 21/045 |
| 2019/0145262 A1 | 5/2019 | House |
| 2021/0301727 A1* | 9/2021 | Asdev ............... F02C 7/32 |
| 2021/0372328 A1* | 12/2021 | Asdev ............... F02C 7/277 |

\* cited by examiner

AIR TURBINE STARTER

CROSS-REFERENCE TO RELATED APPLICATION

This application claims priority to Indian Provisional Patent Application No. 202011037891, filed Sep. 2, 2020, which is incorporated by reference herein in its entirety.

TECHNICAL FIELD

The disclosure generally relates to a starter for a combustion engine, and more specifically to an air turbine starter having a rotatable turbine element.

BACKGROUND

A combustion engine can be engaged in regular operation to an air turbine starter (ATS). The ATS can be used to initiate the rotation of the combustion engine. The ATS is often mounted near the engine and can be coupled to a high-pressure fluid source, such as compressed air, which impinges upon a turbine rotor in the ATS causing it to rotate at a relatively high rate of speed. The ATS includes an output shaft that is coupled to the turbine rotor, typically through a reducing gear box, to the engine. The output shaft therefore rotates with the turbine wheel. This rotation in turn causes a rotatable element of the combustion engine (e.g a crankshaft) to begin rotating. The rotation by the ATS continues until the combustion engine attains a self-sustaining operating rotational speed.

BRIEF DESCRIPTION

Aspects and advantages of the disclosure will be set forth in part in the following description, or may be obvious from the description, or may be learned through practice of the disclosure.

In one aspect, the disclosure relates to an air turbine starter for starting an engine. The air turbine starter includes a starter housing defining an inlet, an outlet, and a flow path extending between the inlet and the outlet, and a turbine section located within the starter housing for rotatably extracting mechanical power from a flow of gas through the flow path, the turbine section including a turbine member comprising a central disk and a set of airfoils spaced circumferentially about the central disk, a sealing structure located within the starter housing, and a fastener closing the sealing structure, the fastener comprising a first end having a cutting face confronting the central disk of the turbine member.

In another aspect, the disclosure relates to an air turbine starter for starting an engine. The air turbine starter includes a starter housing defining an inlet, an outlet, and a flow path extending between the inlet and the outlet, and a turbine section located within the starter housing for rotatably extracting mechanical power from a flow of gas along the flow path, the turbine section comprising a turbine member comprising a central disk and a set of airfoils spaced circumferentially about the central disk, a seal housing axially spaced from the turbine member and containing a seal at least partially therein, and a removable disk cutter having a cutting end confronting the central disk and a fastening end closing the seal housing.

These and other features, aspects and advantages of the present disclosure will become better understood with reference to the following description and appended claims.

The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the present disclosure are broadly directed to an air turbine starter for starting an engine. For the purposes of illustration, one exemplary environment within which the air turbine starter can be utilized will be described in the form of a turbine engine. Such a turbine engine can be in the form of a gas turbine engine, a turboshaft, or a turbofan engine, in non-limiting examples. It will be understood, however, that the disclosure is not so limited and can have general applicability for any implementation of a driving mechanism that generates rotational motion at a driving output and provides the rotational motion to another piece of rotating equipment. For example, the disclosure can have applicability for a starter for other engines or vehicles, and may be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
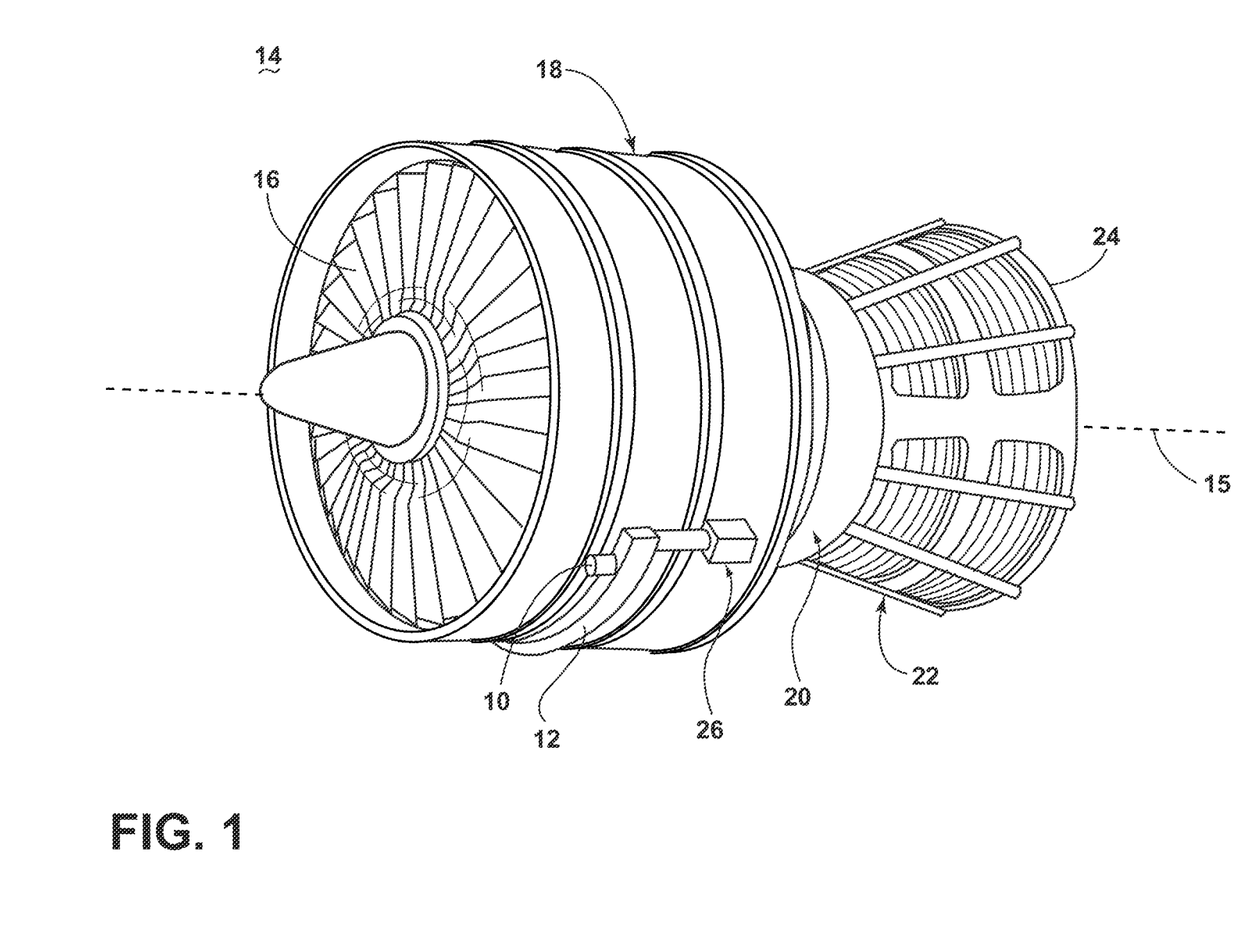
FIG. 1 is a perspective view of a turbine engine with an accessory gearbox and an air turbine starter in accordance with various aspects described herein.

Referring to FIG. 1, an air turbine starter (ATS) 10 is coupled to an accessory gear box (AGB) 12, which are both schematically illustrated as being mounted to a turbine engine 14 such as a gas turbine engine. This assembly is commonly referred to as an Integrated Starter/Generator Gearbox (ISGB). The turbine engine 14 defines an axial direction 15 as shown. The turbine engine 14 includes an air intake with a fan 16 that supplies air to a high pressure compression region 18. The air intake with the fan 16 and the high pressure compression region 18 collectively are known as the "cold section" of the turbine engine 14 upstream of the combustion. The high pressure compression region 18 provides a combustion chamber 20 with high pressure air. In the combustion chamber 20, the high pressure air is mixed with fuel and combusted. Hot and pressurized combustion gases pass through a high pressure turbine region 22 and a low pressure turbine region 24 before exhausting from the turbine engine 14. As the combustion gases pass through the high pressure turbine region 22 and the low pressure turbine region 24, rotational energy is extracted from the flow of the gases passing through the turbine engine 14. A shaft can connect the high pressure turbine region 22 to the high pressure compression 18 region to power the compression mechanism. The low pressure turbine can be coupled to the fan 16 of the air intake by way of a shaft to power the fan 16.

The AGB 12 is coupled to the turbine engine 14 at either the high pressure turbine region 22 or the low pressure turbine region 24 by way of a mechanical power take-off 26. The mechanical power take-off 26 contains multiple gears and components for mechanical coupling of the AGB 12 to the turbine engine 14. Under normal operating conditions, the power take-off 26 translates power from the turbine engine 14 to the AGB 12 to power accessories of the aircraft for example but not limited to fuel pumps, electrical systems, and cabin environment controls. The ATS 10 can be mounted on the outside of either the air intake region containing the fan 16 or on the core near the high-pressure compression region 18.

Figure 2:
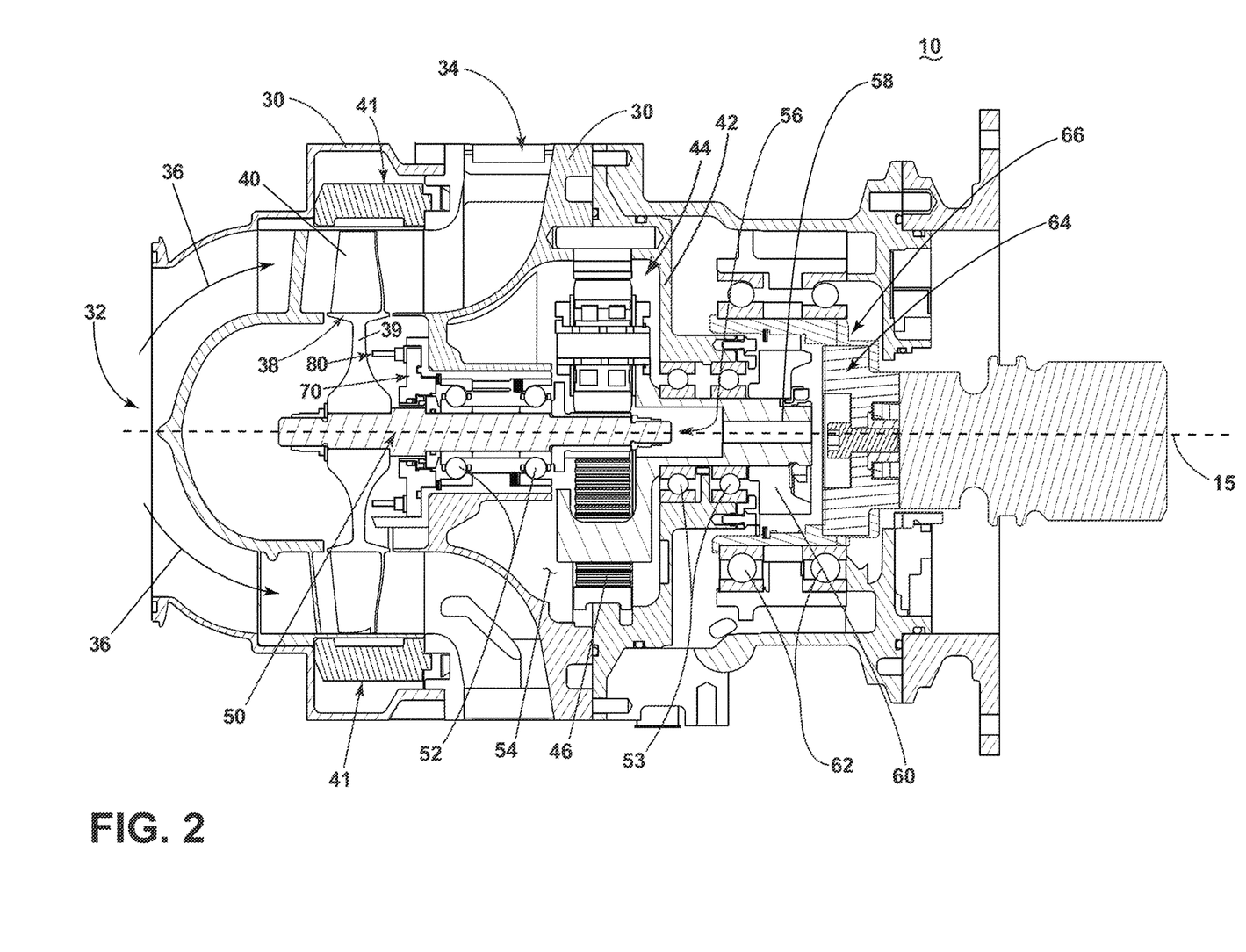
FIG. 2 is a cross-sectional view of the air turbine starter of FIG. 1.

Referring now to FIG. 2, the air turbine starter 10 is shown in cross-section. The axial direction 15 is illustrated through the center of the ATS 10 for clarity. The ATS 10 includes a starter housing 30 defining an inlet 32, an outlet 34, and a flow path 36 extending between the inlet 32 and outlet 34 for communicating a flow of gas therethrough. In one non-limiting example, the gas is air and is supplied from either a ground-operating air cart, an auxiliary power unit, or a cross-bleed start from an engine already operating.

A turbine member 38 is located within the starter housing 30. The turbine member 38 includes a central disk 39 and a set of airfoils 40 spaced circumferentially about the central disk 39. The set of airfoils 40 can be disposed within the flow path 36 for rotatably extracting mechanical power from the flow of gas along the flow path 36. Further, while a single turbine member 38 is illustrated, it is contemplated that multiple turbine members 38 can be provided to form multiple stages within the ATS 10.

A containment system 41 can be disposed in the starter housing 30 surrounding the turbine member 38. In addition, a sealing structure 70 can be located within the starter housing 30. More specifically, the sealing structure 70 can be closed by way of a set of fasteners 80. In the example shown, the set of fasteners 80 secures the sealing structure 70 to the starter housing 30, though this need not be the case. The sealing structure 70 can at least partially seal the flow path 36 from other portions of the air turbine starter 10.

A gear box 42 is illustrated as mounted within the starter housing 30. A gear train 44 can be disposed within the gear box 42 and drivingly coupled with the turbine member 38. In the illustrated example, the gear train 44 includes a ring gear 46. It will be understood that the gear train 44 can include any suitable gear assembly including, but not limited to, a planetary gear assembly, a pinion gear assembly, or the like. A turbine shaft 50 couples the gear train 44 to the turbine member 38 allowing for the transfer of mechanical power to the gear train 44. The turbine shaft 50 is coupled to the gear train 44 and rotatably supported by a pair of turbine bearings 52. The gear train 44 is supported by a pair of carrier bearings 53.

A gear box interior 54 can be provided for containing a lubricant, including, but not limited to, grease or oil. The gear box interior 54 can provide lubrication and cooling to mechanical parts contained therein, such as the gear train 44, ring gear 46, turbine bearings 52, carrier bearings 53, or the like.

An aperture 56 is provided in the gear box 42. The turbine shaft 50 can extend through the aperture 56 and mesh with a carrier shaft 58 to which a clutch 60 is mounted and supported by a pair of spaced bearings 62. A drive shaft 64 extends from the gear box 42 and is coupled to the clutch 60 and additionally supported by the pair of spaced bearings 62. The drive shaft 64 is driven by the gear train 44 and coupled to the AGB 12, such that during a starting operation the drive shaft 64 provides a driving motion to the AGB 12.

The clutch 60 can be any type of shaft interface portion that forms a single rotatable shaft 66 comprising the turbine shaft 50, the carrier shaft 58, and the drive shaft 64. The shaft interface portion can be by any known method of coupling including, but not limited to, gears, splines, a clutch mechanism, or the like, or combinations thereof.

The ATS 10 can be formed by any materials and methods, including, but not limited to, die-casting of high strength and lightweight metals such as aluminum, stainless steel, iron, titanium, or the like. The starter housing 30 and the gear box 42 can be formed with a thickness sufficient to provide adequate mechanical rigidity without adding unnecessary weight to the ATS 10. Furthermore, the rotatable shaft 66 can be constructed by any materials and methods, including, but not limited to extrusion or machining of high strength metal alloys such as those containing aluminum, iron, nickel, chromium, titanium, tungsten, vanadium, or molybdenum. The diameter of the turbine shaft 50, carrier shaft 58, and drive shaft 64 can be fixed or vary along the length of the rotatable shaft 66. In non-limiting examples, the diameter of the turbine shaft 50 can vary to accommodate different sizes of components coupled thereto, or to accommodate a variable rotor-to-stator spacing.

During a starting operation, air supplied along the flow path 36 rotates the turbine member 38 for driving the rotation of the rotatable shaft 66. In this manner, the ATS 10 can be the driving mechanism for the turbine engine 14 via rotation of the rotatable shaft 66.

In addition, during operation of the ATS 10, rotational imbalances may be present within the turbine member 38. In such a case, the turbine member 38 may be caused to contact portions of the ATS 10, such as the starter housing 30 or sealing structure 70.

Figure 3:
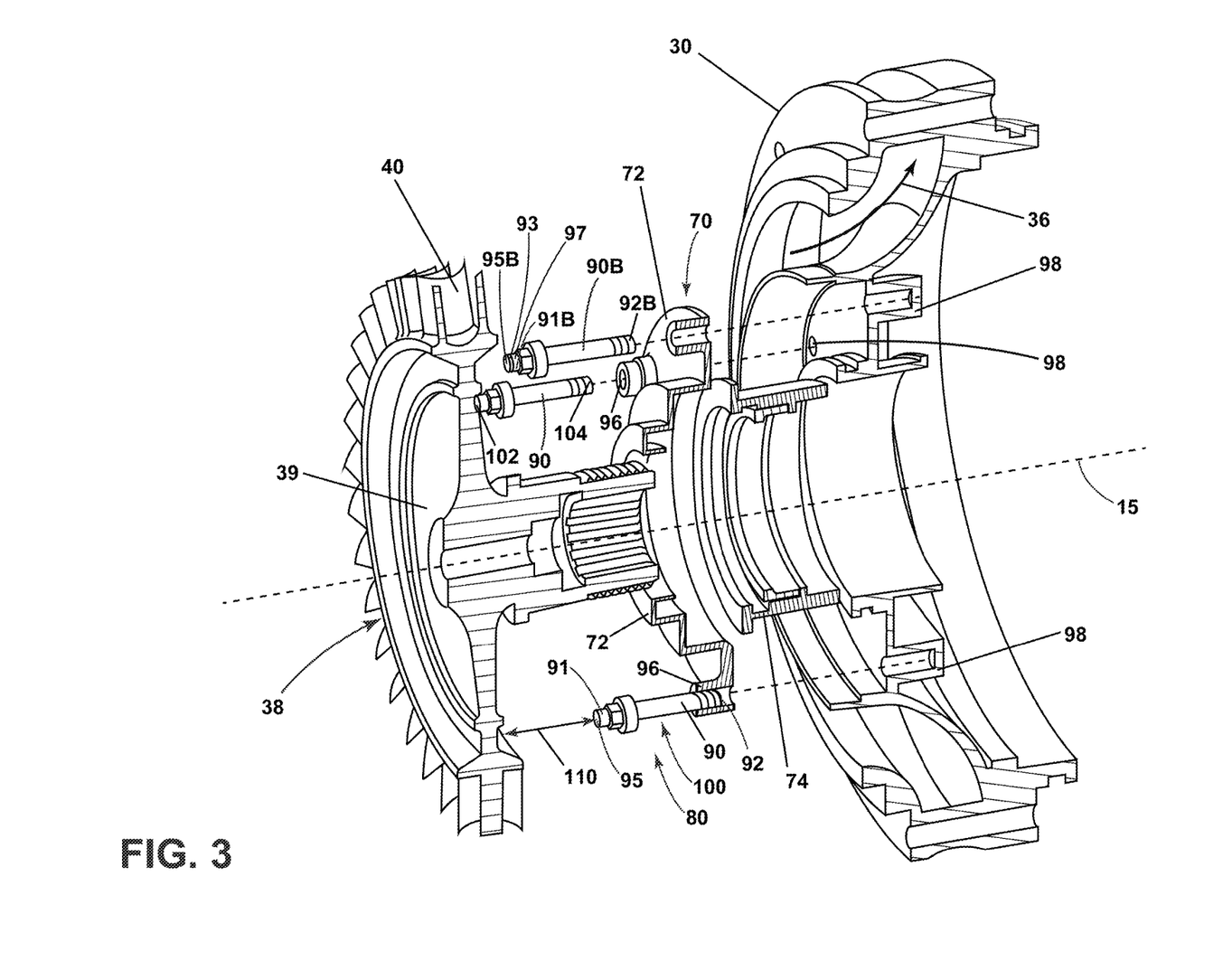
FIG. 3 is a partially-exploded view of a portion of the air turbine starter of FIG. 2 illustrating a turbine member and a set of fasteners in accordance with various aspects described herein.

FIG. 3 illustrates a partially-exploded view of a portion of the air turbine starter 10. The turbine member 38 is shown with the set of airfoils 40 spaced about the central disk 39. The sealing structure 70 is located adjacent to the turbine member 38. In the example shown, the sealing structure 70 includes a seal housing 72 and a seal 74 located adjacent the seal housing 72. In the example shown, the seal 74 is in the form of a bearing sleeve though this need not be the case. The seal 74 can be formed of any suitable material including, but not limited to, steel, aluminum, nickel or nickel alloy, carbon, graphite, a polymeric material, a composite material, or the like, or combinations thereof.

The set of fasteners 80 can include any suitable fasteners, including bolts or screws, and can also be formed of any suitable material, including steel, aluminum, nickel or nickel alloy, or the like, or combinations thereof. Further, the set of fasteners 80 can include any number of fasteners, including only one fastener.

In the illustrated example, the set of fasteners 80 includes multiple fasteners arranged circumferentially on the sealing structure 70. For clarity, one exemplary fastener 90 is shown partially assembled with the seal housing 72, while other fasteners are shown partially exploded from the seal housing 72 and starter housing 30.

The exemplary fastener 90 in the set of fasteners 80 includes a first end 91 having a sharpened portion in the form of a cutting face 95 confronting the central disk 39. In the example shown, the cutting face 95 is schematically illustrated with a generally circular geometric profile. The cutting face 95 can have any suitable form or geometric profile including, but not limited to, a pointed/pyramidal tip, an annular sharpened cutting surface, a rough turning tool, a parting off tool, or the like.

The fastener 90 also includes a second end 92 opposite the first end 91. Optionally, the second end 92 can be threaded as in the example shown. In addition, the seal housing 72 includes a seal aperture 96 in registry with a housing aperture 98 in the starter housing 30. The second end 92 can be received within the seal aperture 96 and the housing aperture 98. In this manner, the fastener 90 can be configured to secure the seal housing 72 to the starter housing 30. The seal 74 can be located between the seal housing 72 and the starter housing 30 and secured in place by at least the fastener 90. In this manner, the fastener 90 can close the sealing structure 70. Additionally or alternatively, the fastener 90 can secure the seal housing 72 to the starter housing 30 with the seal 74 positioned therebetween. It is contemplated that either or both of the seal aperture 96 or housing aperture 98 can include threading to receive the second end 92, such that the threaded second end 92 can be threaded into the seal housing 72. Additionally or alternatively, a threaded insert can be utilized within either or both of the seal aperture 96 or housing aperture 98 to receive the second end 92. In still another example, the second end can extend fully through both the seal aperture 96 and housing aperture 98 and be retained using nuts, locking pins, or the like.

In this manner, the fastener 90 can define a removable disk cutter 100 with the first end 91 defining a cutting end 102 confronting the central disk 39, and with the second end 92 defining a fastening end 104 received within the seal housing 72. The fastening end 104 can therefore secure the seal housing 72 to the starter housing 30.

An operative spacing distance 110 can be defined between the fastener 90 and the turbine member 38 when the air turbine starter 10 is assembled. For clarity, the fastener 90 is shown partially assembled with the seal aperture 96 to illustrate the operative spacing distance 110 in the otherwise partially-exploded view of FIG. 3. More specifically, the operative spacing distance 110 is shown between the cutting face 95 and the central disk 39. The operative spacing distance 110 can be between 0 cm and 30 cm, in one non-limiting example. More specifically, in a non-limiting example, the operative spacing distance can be 20-30 cm between the cutting face 95 and the central disk 39 during normal or standard operation of the air turbine starter 10, or during normal or standard rotation of the turbine member 38. In yet another example, the operative spacing distance 110 can be any value greater than 0 cm and also controlled to avoid rotor strike during normal or standard operation of the air turbine starter 10, or during normal or standard rotation of the turbine member 38.

A second fastener 90B is shown in the set of fasteners 80 having a corresponding first end 91B with a cutting face 95B as well as a threaded second end 92B. The cutting face 95B includes an outer layer 93 positioned over a base layer 97. The outer layer 93 can comprise a hardened material compared to either or both of the central disk 39 or the base layer 97. As used herein, a "hardened material" will refer to a material having a greater material hardness, yield strength, true tensile strength, modulus of elasticity, bulk strength, shear strength, Mohs-scale hardness, or the like, when compared to a second material. For example, the outer layer 93 can have a greater material hardness compared to that of the central disk 39. In another example, the base layer 97 can include a steel material, and the outer layer 93 can be in the form of a diamond tip. It is contemplated that any number of fasteners in the set of fasteners 80 can include such a hardened-material outer layer 93.

Still further, the set of fasteners 80 can include a material having a high temperature capability. As used herein, "temperature capability" will refer to the highest operating temperature contemplated for use for a given material, wherein subjecting the material to temperatures higher than its temperature capability can cause effects such as oxidation, fatigue, plastic deformation, or melting of the material. For example, a fastener in the set of fasteners 80 can include steel coated with a ceramic outer layer or tip, or a hard material cold spray coating, or an electrodeposited outer layer, or the like.

Figure 4:
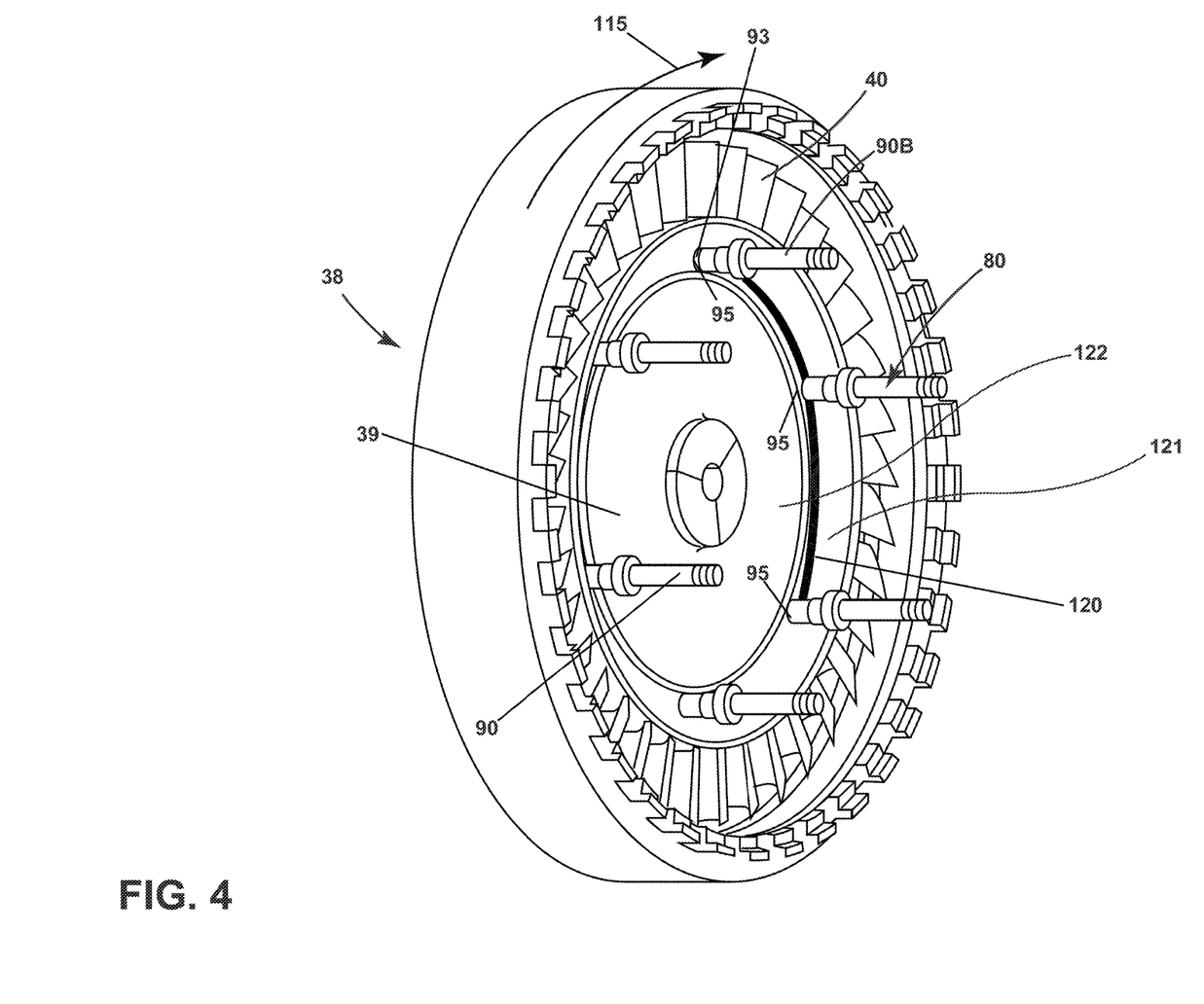
FIG. 4 is a perspective view of the turbine member and set of fasteners of FIG. 3 during an example of operation.

FIG. 4 illustrates the turbine member 38 and the set of fasteners 80 in the event of an imbalance condition during operation of the air turbine starter 10. For clarity, the turbine member 38 and set of fasteners 80 are shown in isolation wherein other portions of the ATS 10 are not illustrated. The turbine member 38 is illustrated as rotating in a direction marked with arrow 115.

It can be appreciated that a rotational imbalance of the turbine member 38 can cause axial motion of the central disk 39 such that the operative spacing distance 110 (FIG. 3) is reduced from its "normal" or standard value during normal operation of the ATS 10. In the event that the operative spacing distance 110 (FIG. 3) is reduced to 0 cm, the central disk 39 contacts the cutting face 95 of at least one fastener 90. Each cutting face 95 is configured to remove material from the rotating central disk 39 upon contact. Grooves 120 are illustrated along the central disk 39 as a result of contact with the set of fasteners 80. It is contemplated that the grooves 120 can extend fully through the central disk 39, thereby separating the turbine member 38 into at least a first segment 121 and a second segment 122. The first segment 121 includes a first portion of the central disk 39 and the set of airfoils 40. The second segment 122 includes a second portion of the central disk 39 coupled to the turbine shaft 50. In this manner the cutting face 95 is configured to liberate or release at least a portion of the turbine member, such as the first segment 121, during an imbalance condition. It is further contemplated that the containment system 41 (FIG. 1) can contain the released first segment 121 and prevent components thereof from moving to other portions of the air turbine starter 10.

Figure 5:
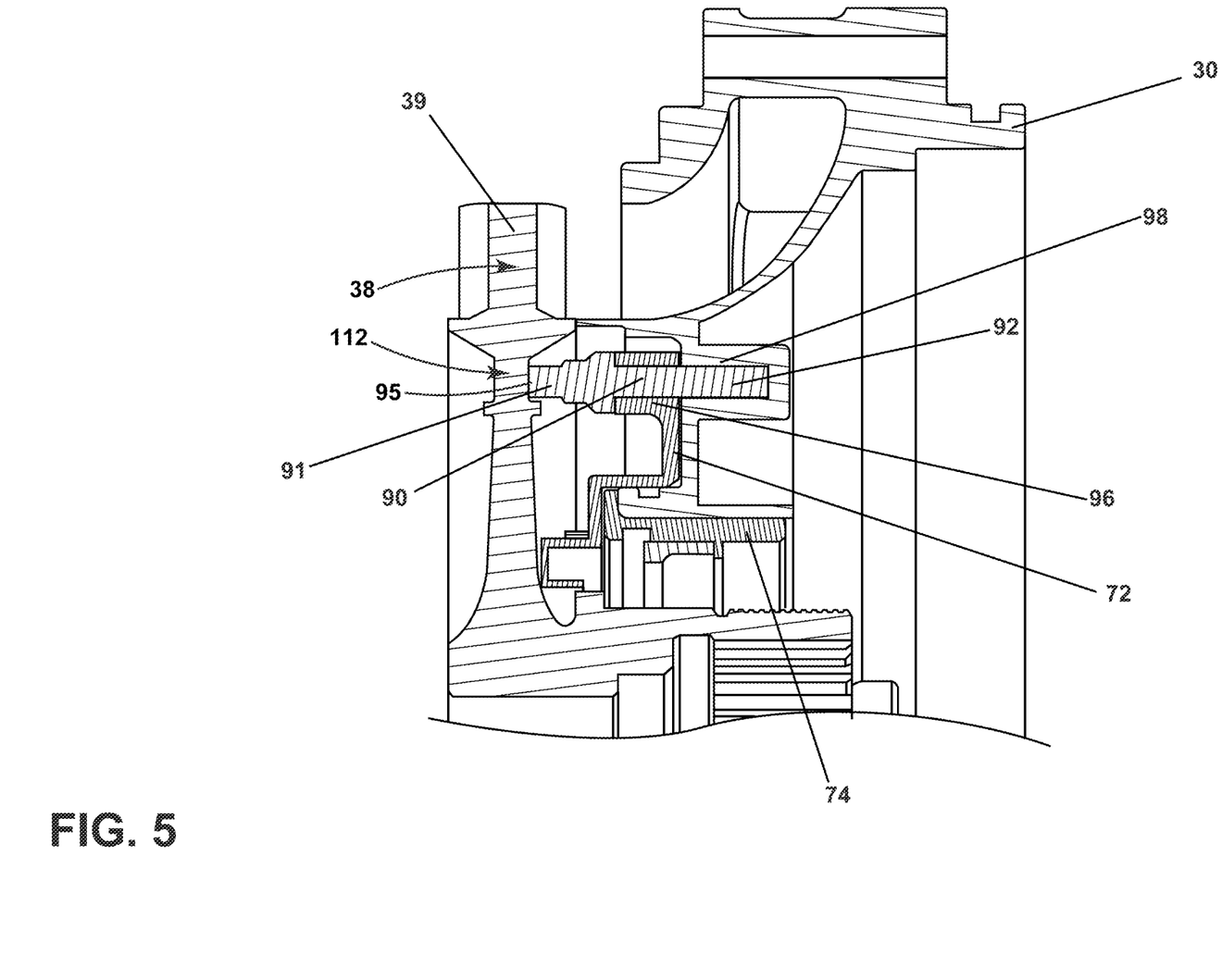
FIG. 5 is a cross-sectional view of the portion of the air turbine starter of FIG. 3.

FIG. 5 is a cross-sectional view of a portion of the assembled ATS 10 during an imbalance condition, such as that shown in FIG. 4. In the example shown, the central disk 39 includes a reduced cross-sectional thickness 112 though this need not be the case. The set of fasteners 80 is arranged on the seal housing 72 in axial alignment with the reduced cross-sectional thickness 112. The fastener 90 is in contact with the central disk 39, and the resulting operative spacing distance 110 (FIG. 3) is 0 cm. The housing aperture 98 and seal aperture 96 are in registry with the second end 92 of the fastener 90 securing the seal housing 72 to the starter housing 30. The seal 74 is contained at least partially within the seal housing 72, with the seal 74 being located between the seal housing 72 and the starter housing 30. It can be appreciated that the fastener 90 can also secure the seal 74 in position within the air turbine starter 10.

Aspects of the disclosure provide for a removable disk cutter in the form of a fastener that can be utilized to liberate a portion of an unbalanced turbine member during operation of the air turbine starter. Benefits of the described fastener or set of fasteners include a simplified design that does not add weight or complexity compared to traditional, dedicated disk cutters that must be mounted to a portion of the exhaust duct or starter housing. By utilizing the fasteners already present in the sealing structure, the described aspects provide for reduced weight and improved process efficiencies in installation. Furthermore, the described aspects provide for a more easily repaired or replaceable disk cutter, which improves serviceability of the air turbine starter.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An air turbine starter for starting an engine, comprising a starter housing defining an inlet, an outlet, and a flow path extending between the inlet and the outlet, and a turbine section located within the starter housing for rotatably extracting mechanical power from a flow of gas through the flow path, the turbine section comprising a turbine member comprising a central disk and a set of airfoils spaced circumferentially about the central disk, a sealing structure located within the starter housing, and a fastener closing the sealing structure, the fastener comprising a first end having a cutting face confronting the central disk of the turbine member.

2. The air turbine starter of any preceding clause wherein the sealing structure comprises a seal housing and a seal located adjacent the seal housing.

3. The air turbine starter of any preceding clause wherein the fastener is configured to secure the seal housing to the starter housing, with the seal positioned between the seal housing and the starter housing.

4. The air turbine starter of any preceding clause wherein the fastener comprises a threaded second end opposite the first end, and wherein the threaded second end is threaded into the seal housing.

5. The air turbine starter of any preceding clause wherein the cutting face is positioned in axial alignment with the central disk of the turbine member.

6. The air turbine starter of any preceding clause wherein the cutting face is configured to release at least a portion of the turbine member during an imbalance condition.

7. The air turbine starter of any preceding clause wherein the released portion of the turbine member comprises the set of airfoils and a portion of the central disk.

8. The air turbine starter of any preceding clause, further comprising an operative spacing distance defined between the cutting face and the central disk.

9. The air turbine starter of any preceding clause wherein the operative spacing distance is between 0 cm and 30 cm.

10. The air turbine starter of any preceding clause, further comprising a set of fasteners closing the sealing structure and including the fastener.

11. The air turbine starter of any preceding clause wherein the set of fasteners is arranged circumferentially on the sealing structure.

12. The air turbine starter of any preceding clause wherein the set of fasteners comprises a set of threaded bolts.

13. The air turbine starter of any preceding clause wherein the central disk comprises a reduced cross-sectional thickness, and wherein the set of fasteners is arranged on the sealing structure in axial alignment with the reduced cross-sectional thickness.

14. The air turbine starter of any preceding clause wherein the cutting face comprises an outer layer positioned over a base layer, wherein the outer layer comprises a material with a greater hardness than the central disk.

15. The air turbine starter of any preceding clause wherein the outer material layer comprises a diamond tip.

16. An air turbine starter for starting an engine, comprising a starter housing defining an inlet, an outlet, and a flow path extending between the inlet and the outlet, and a turbine section located within the starter housing for rotatably extracting mechanical power from a flow of gas along the flow path, the turbine section comprising a turbine member comprising a central disk and a set of airfoils spaced circumferentially about the central disk, a seal housing axially spaced from the turbine member and containing a seal at least partially therein, and a removable disk cutter having a cutting end confronting the central disk and a fastening end closing the seal housing.

17. The air turbine starter of any preceding clause wherein the removable disk cutter comprises a threaded bolt threaded into the seal housing, wherein a head of the threaded bolt comprises the cutting end.

18. The air turbine starter of any preceding clause wherein the cutting end is configured to release at least a portion of the turbine member during an imbalance condition.

19. The air turbine starter of any preceding clause wherein the released portion of the turbine member comprises the set of airfoils and a portion of the central disk.

20. The air turbine starter of any preceding clause, further comprising an operative spacing distance defined between the cutting end and the central disk, wherein the operative spacing distance is between 0 cm and 30 cm.

What is claimed is:

1. An air turbine starter for starting an engine, comprising:
a starter housing defining an inlet, an outlet, and a flow path extending between the inlet and the outlet; and
a turbine section located within the starter housing for rotatably extracting mechanical power from a flow of gas through the flow path, the turbine section comprising:
a turbine member comprising a central disk and a set of airfoils spaced circumferentially about the central disk;
a sealing structure located within the starter housing; and
a fastener closing the sealing structure, the fastener comprising a threaded bolt with a first end comprising a head with a cutting face confronting the central disk of the turbine member.

2. The air turbine starter of claim 1 wherein the sealing structure comprises a seal housing and a seal located adjacent the seal housing.

3. The air turbine starter of claim 2 wherein the fastener is configured to secure the seal housing to the starter housing, with the seal positioned between the seal housing and the starter housing.

4. The air turbine starter of claim 3 wherein the fastener comprises a threaded second end opposite the first end, and wherein the threaded second end is threaded into the seal housing.

5. The air turbine starter of claim 1 wherein the cutting face is positioned in axial alignment with the central disk of the turbine member.

6. The air turbine starter of claim 5 wherein the cutting face is configured to release at least a portion of the turbine member during an imbalance condition.

7. The air turbine starter of claim 6 wherein the released portion of the turbine member comprises the set of airfoils and a portion of the central disk.

8. The air turbine starter of claim 1, further comprising an operative spacing distance defined between the cutting face and the central disk.

9. The air turbine starter of claim 8 wherein the operative spacing distance is between 0 cm and 30 cm.

10. The air turbine starter of claim 1, further comprising a set of fasteners closing the sealing structure and including the fastener.

11. The air turbine starter of claim 10 wherein the set of fasteners is arranged circumferentially on the sealing structure.

12. The air turbine starter of claim 11 wherein the set of fasteners comprises a set of threaded bolts.

13. The air turbine starter of claim 10 wherein the central disk comprises a reduced cross-sectional thickness, and wherein the set of fasteners is arranged on the sealing structure in axial alignment with the reduced cross-sectional thickness.

14. The air turbine starter of claim 1 wherein the cutting face comprises an outer layer positioned over a base layer, wherein the outer layer comprises a material with a greater hardness than the central disk.

15. The air turbine starter of claim 14 wherein the outer material layer comprises a diamond tip.

16. An air turbine starter for starting an engine, comprising:
a starter housing defining an inlet, an outlet, and a flow path extending between the inlet and the outlet; and
a turbine section located within the starter housing for rotatably extracting mechanical power from a flow of gas along the flow path, the turbine section comprising:
a turbine member comprising a central disk and a set of airfoils spaced circumferentially about the central disk;
a seal housing axially spaced from the turbine member and containing a seal at least partially therein; and
a removable disk cutter having a cutting end confronting the central disk and a fastening end closing the seal housing, wherein the removable disk cutter comprises a threaded bolt threaded into the seal housing, wherein a head of the threaded bolt comprises the cutting end.

17. The air turbine starter of claim 16 wherein the cutting end is configured to release at least a portion of the turbine member during an imbalance condition.

18. The air turbine starter of claim 17 wherein the released portion of the turbine member comprises the set of airfoils and a portion of the central disk.

19. The air turbine starter of claim 16, further comprising an operative spacing distance defined between the cutting end and the central disk, wherein the operative spacing distance is between 0 cm and 30 cm.

* * * * *